(12) United States Patent  (10) Patent No.: US 8,834,280 B2
Scheper et al.  (45) Date of Patent: Sep. 16, 2014

(54) ELASTIC JOINT BODY

(75) Inventors: Bernd Scheper, Reichertsheim (DE);
Josef Stubenrauch, Rott am Inn (DE);
Juergen Leinfelder, Waldkralburg (DE);
Marc Brandl, Burgkirchen (DE);
Wolfgang Nindel, Muehldorf (DE)

(73) Assignee: SGF Sueddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 0 days.

(21) Appl. No.: 14/003,804

(22) PCT Filed: Mar. 6, 2012

(86) PCT No.: PCT/EP2012/000991
§ 371 (c)(1),
(2), (4) Date: Nov. 7, 2013

(87) PCT Pub. No.: WO2012/119760
PCT Pub. Date: Sep. 13, 2012

(65) Prior Publication Data
US 2014/0128167 A1  May 8, 2014

(30) Foreign Application Priority Data
Mar. 8, 2011 (DE) .......................... 10 2011 013 332

(51) Int. Cl.
*F16D 3/62* (2006.01)
*F16D 3/78* (2006.01)
(52) U.S. Cl.
CPC ... *F16D 3/62* (2013.01); *F16D 3/78* (2013.01)
USPC ........................................................ 464/69

(58) Field of Classification Search
USPC ................................ 464/69, 93–95; 74/579 R
See application file for complete search history.

(56) References Cited

U.S. PATENT DOCUMENTS

| 1,114,326 | A | 10/1914 | Allen |
| 1,424,051 | A | 7/1922 | Wayne |

(Continued)

FOREIGN PATENT DOCUMENTS

| DE | 3734089 A1 | 6/1988 |
| DE | 4304274 C1 | 3/1994 |

(Continued)

OTHER PUBLICATIONS

International Search Report issued in corresponding application No. PCT/EP2012/000991 on May 30, 2012.

*Primary Examiner* — Gregory Binda
(74) *Attorney, Agent, or Firm* — Carter, DeLuca, Farrell & Schmidt, LLP

(57) ABSTRACT

An elastic joint body for a shaft arrangement for connecting two shaft portions in an articulated manner includes a plurality of bushings, a primary loop bundle, a support device, and an elastomeric casing. The primary loop bundle loops a bushing pair consisting of two adjacent bushings. The bushing pair being loadable in tension in the event of a torque transfer via the shaft portions. The support device is arranged on at least one bushing for axially guiding the primary loop bundle. The loop bundle, the support devices, and the bushings are at least partly embedded into the elastomeric casing. The adjacent bushings of at least some of the bushing pairs are connected to each other in a force-transmitting manner via at least one additional loop bundle, the at least one additional bundle being arranged in the elastomeric casing in a region in which none of the primary loop bundles extend.

17 Claims, 23 Drawing Sheets

(56) References Cited

U.S. PATENT DOCUMENTS

| | | | |
|---|---|---|---|
| 2,073,852 A | | 3/1937 | Radford |
| 3,362,252 A | * | 1/1968 | Ditlinger .................. 74/579 R |
| 4,031,714 A | * | 6/1977 | Faust ........................... 464/69 |
| 4,182,139 A | | 1/1980 | Beeskow et al. |
| 4,300,410 A | * | 11/1981 | Raghupathi et al. ........ 74/579 R |
| 8,460,113 B2 | | 6/2013 | Waehling et al. |

FOREIGN PATENT DOCUMENTS

| | | |
|---|---|---|
| DE | 197 42 359 A1 | 4/1999 |
| DE | 102008047596 A | 3/2010 |
| FR | 542 935 A | 8/1922 |
| GB | 917680 A | 2/1963 |
| WO | 2010/037538 A1 | 4/2010 |

* cited by examiner

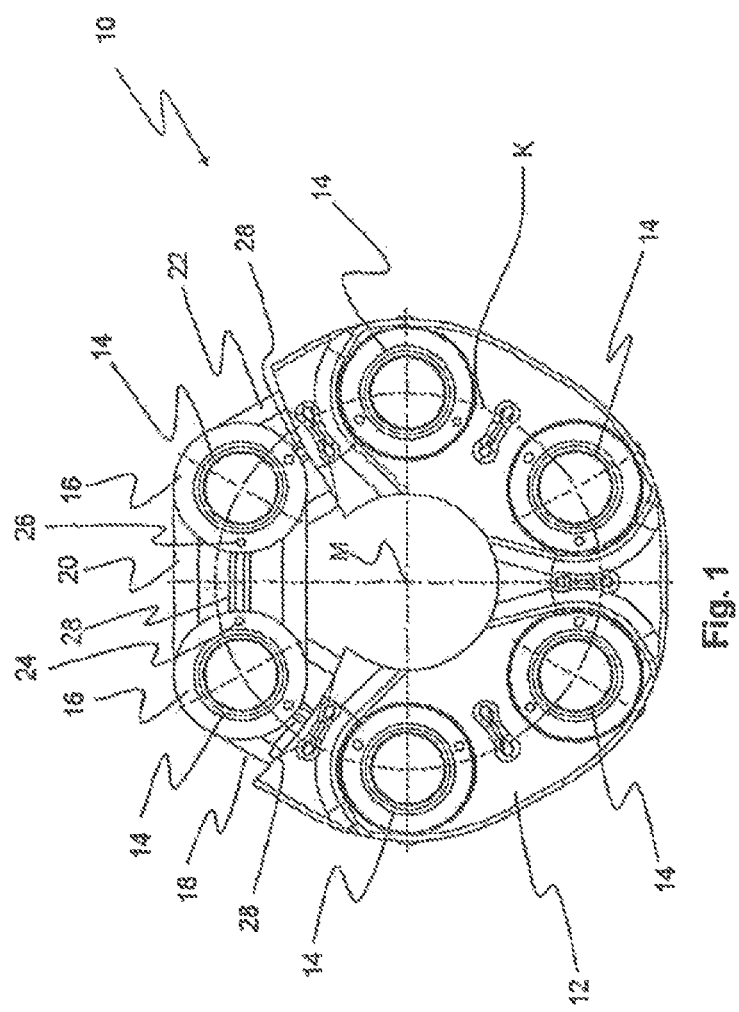

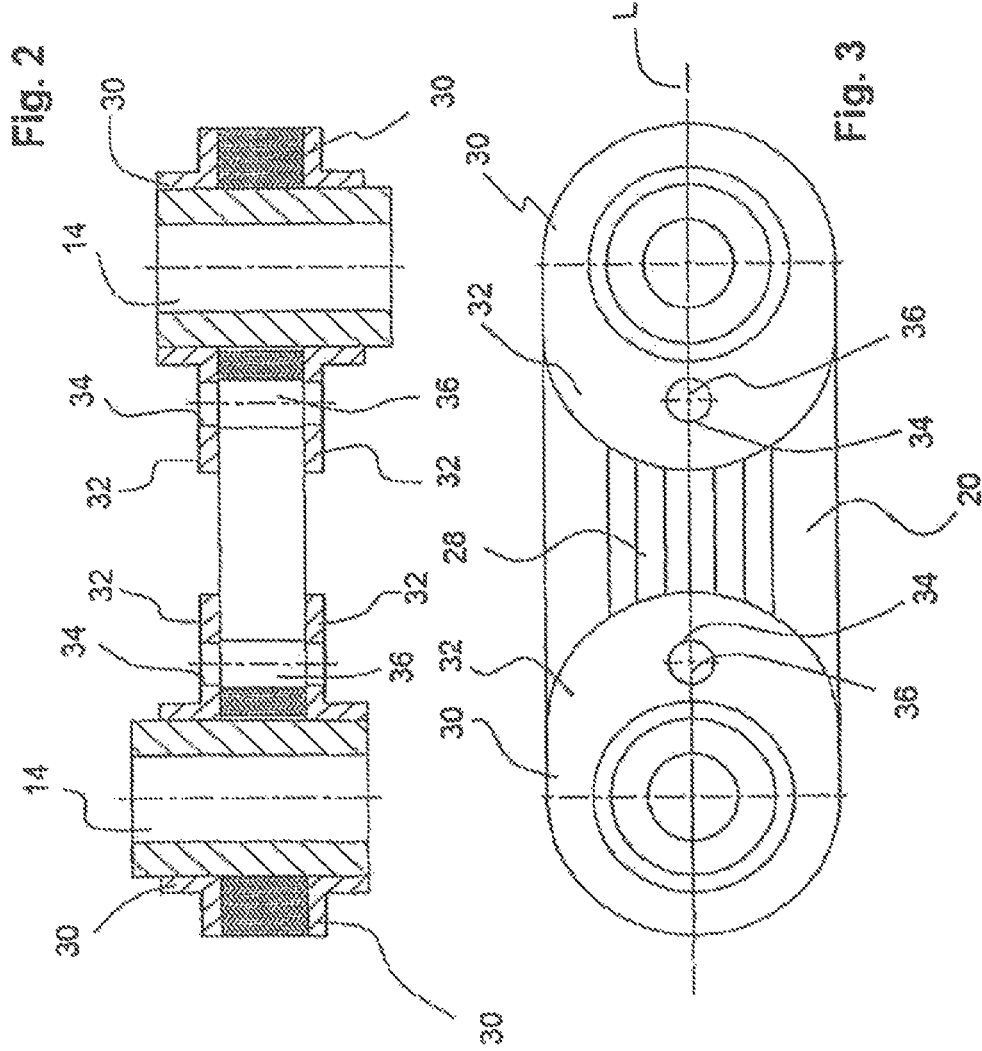

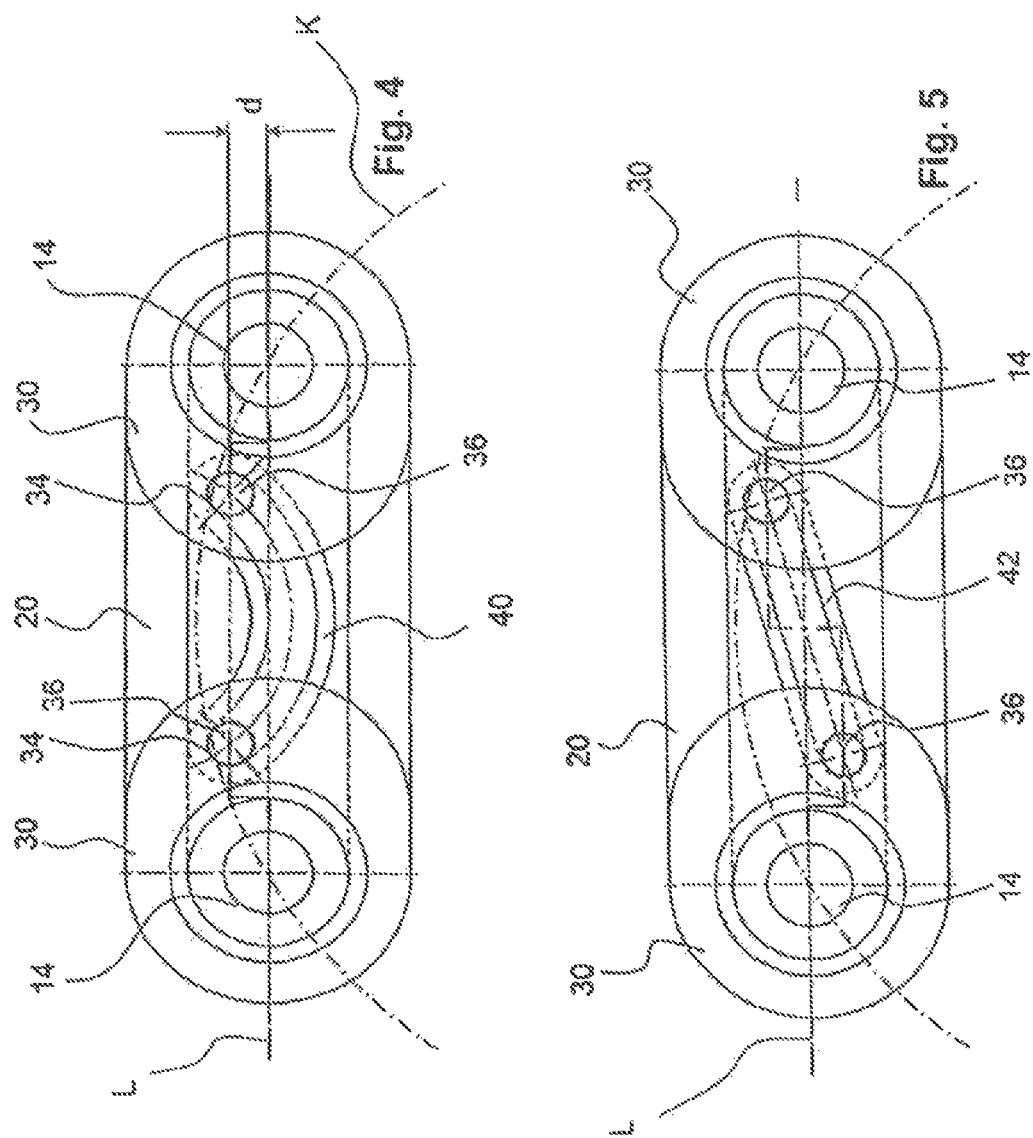

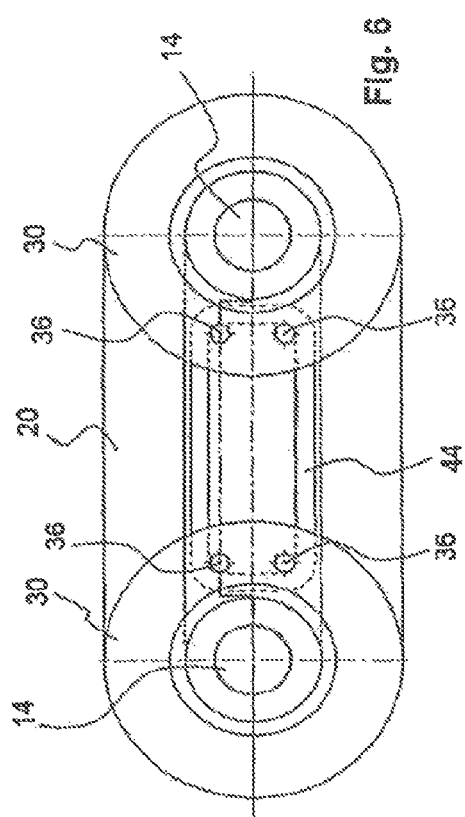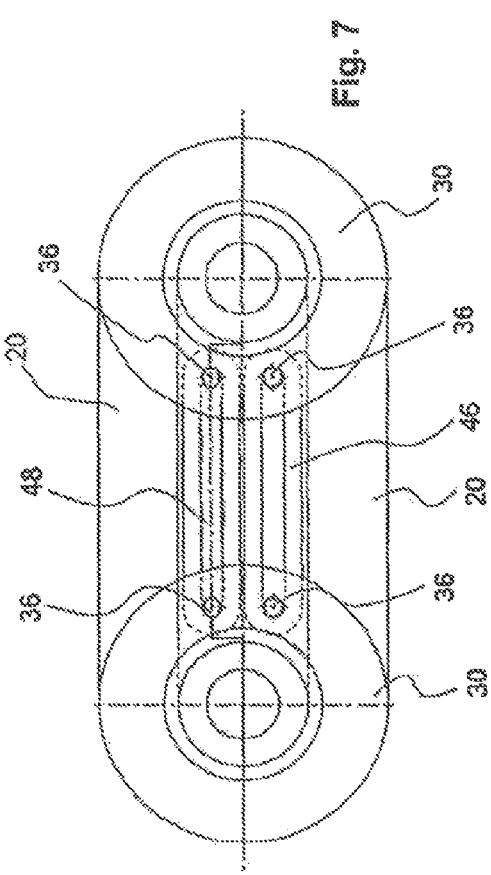

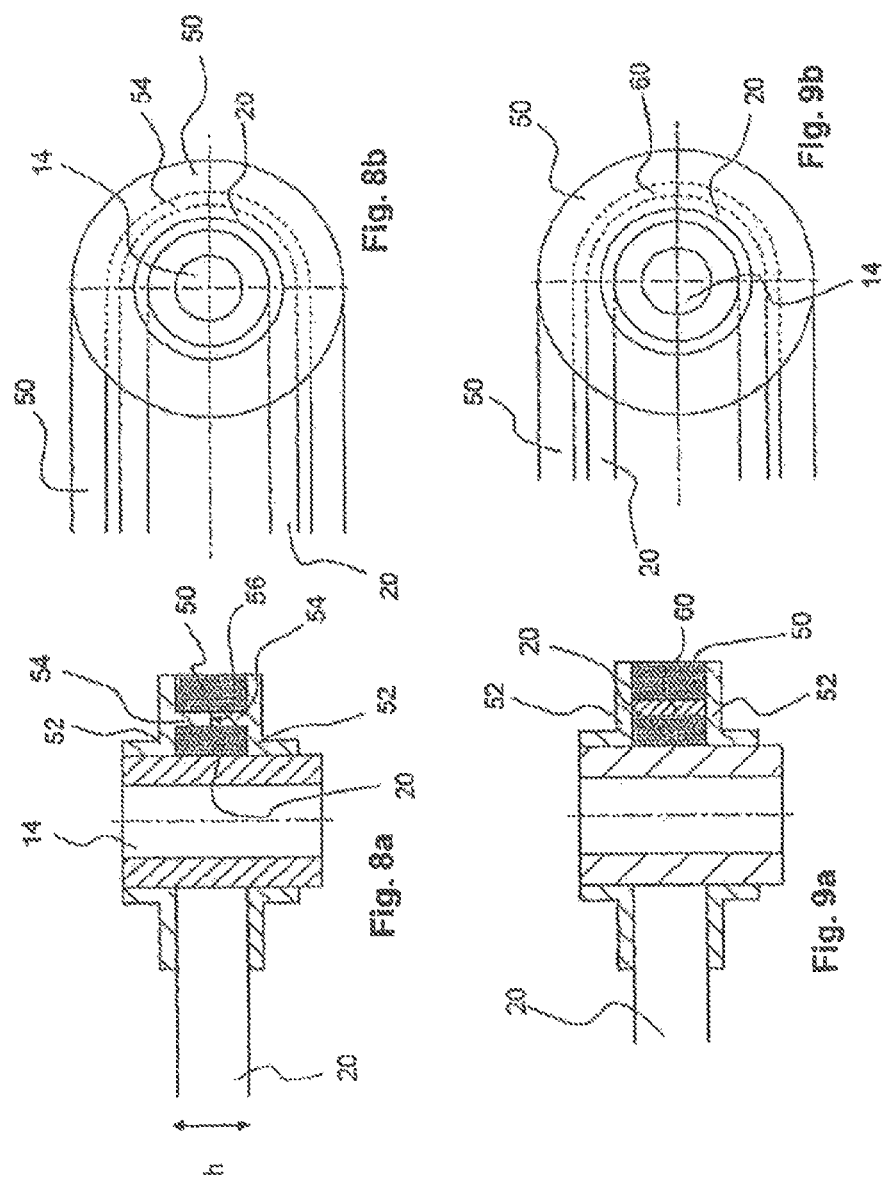

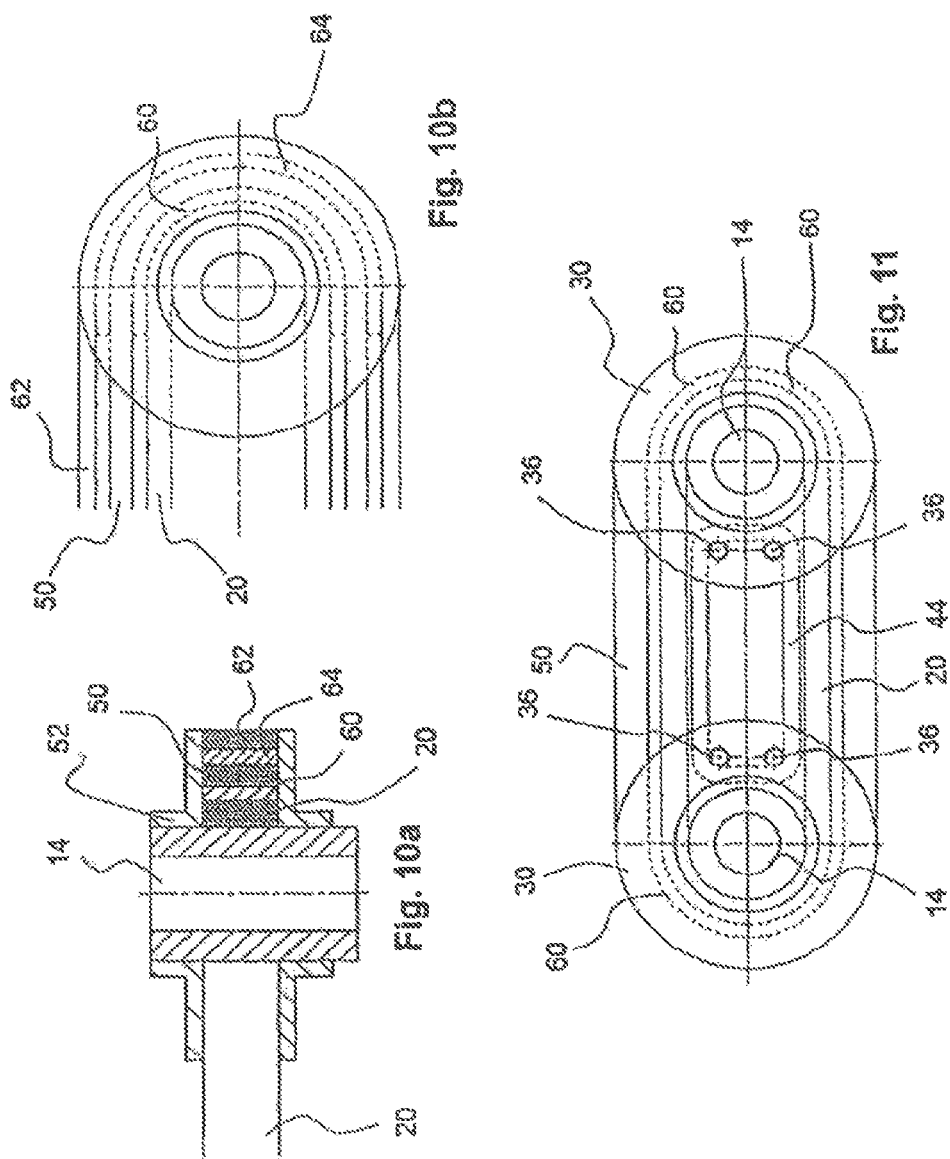

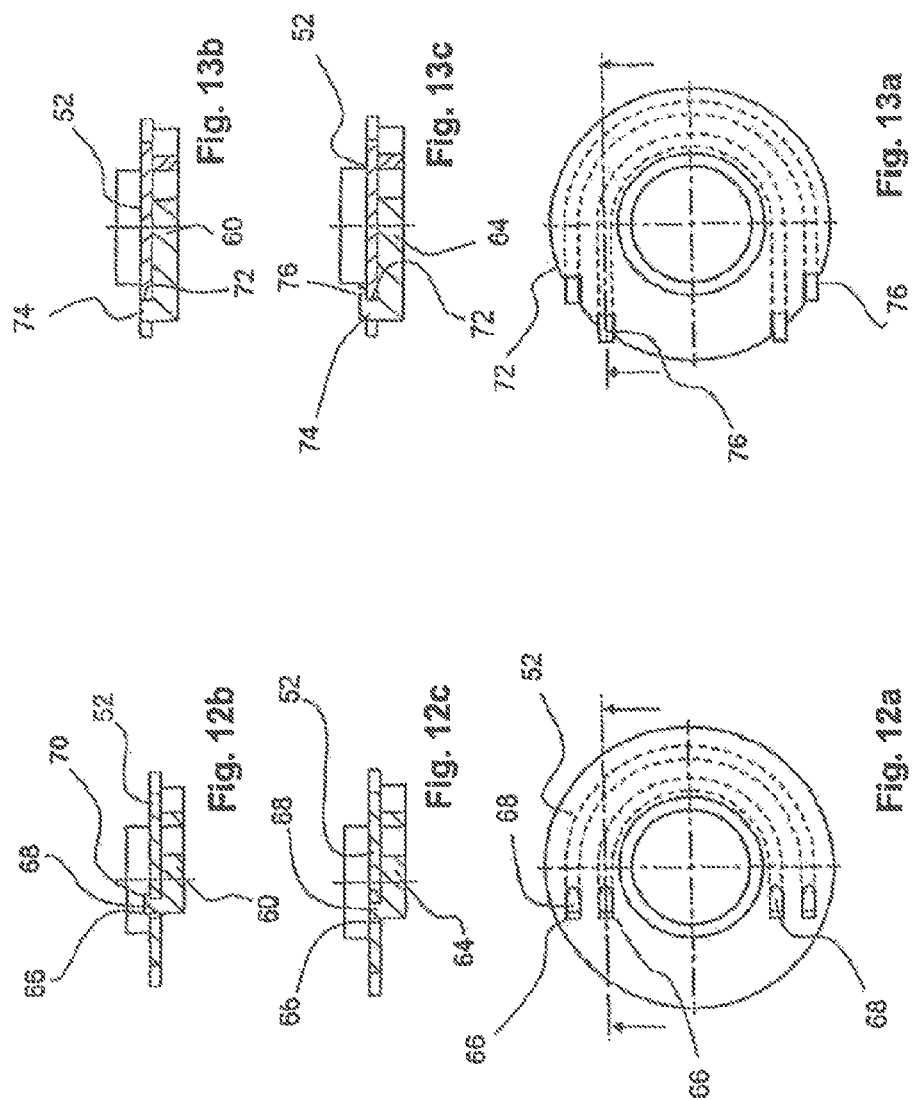

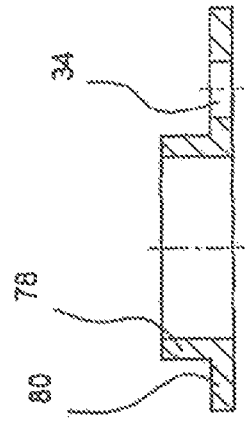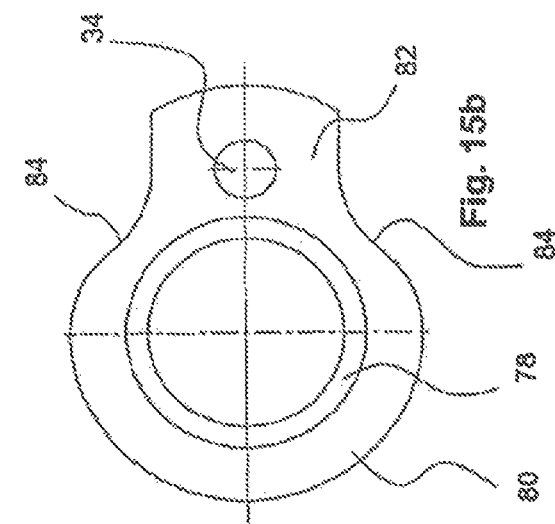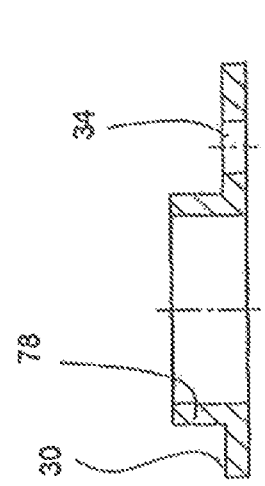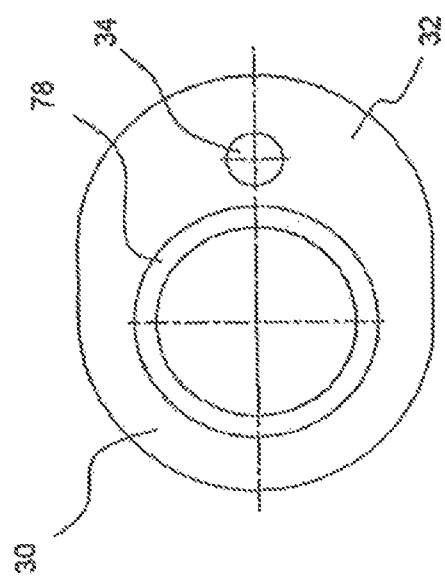

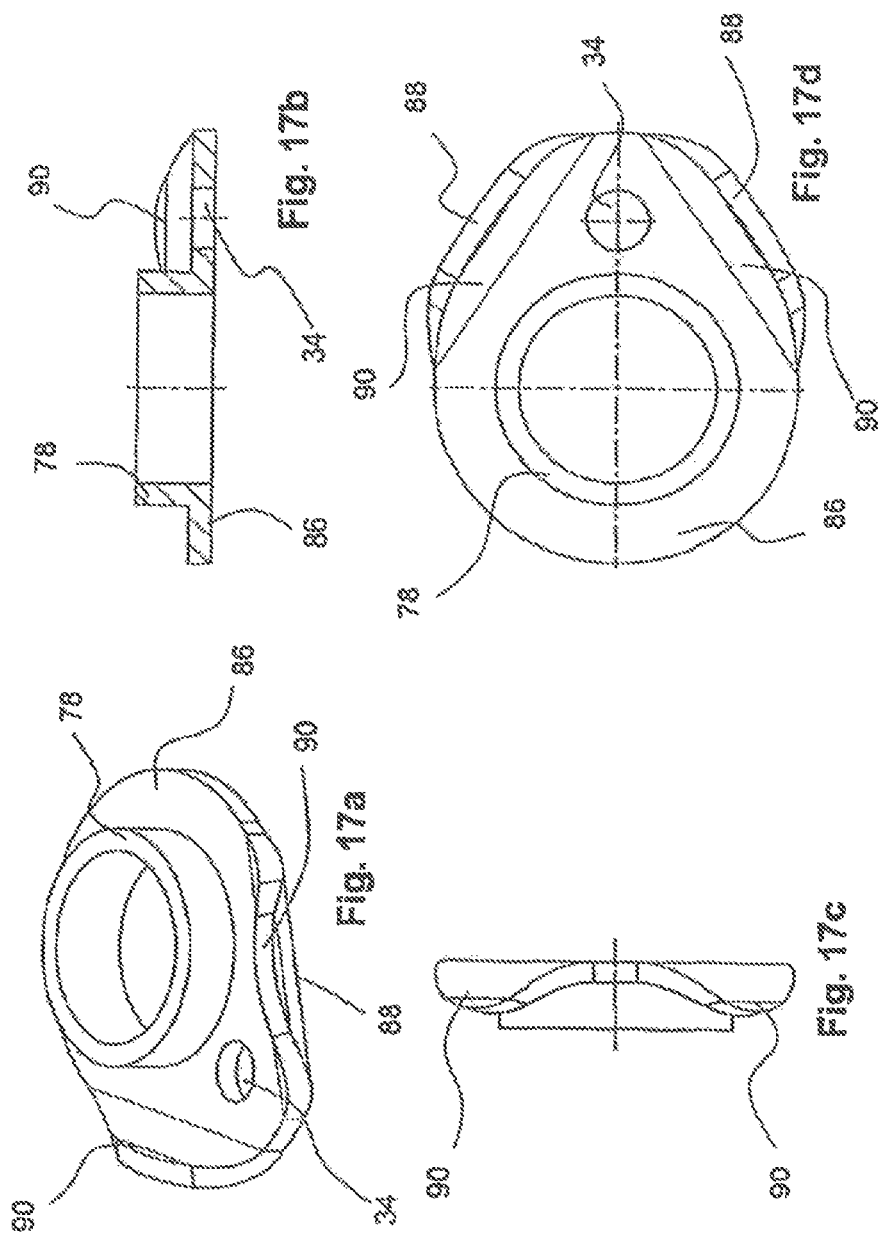

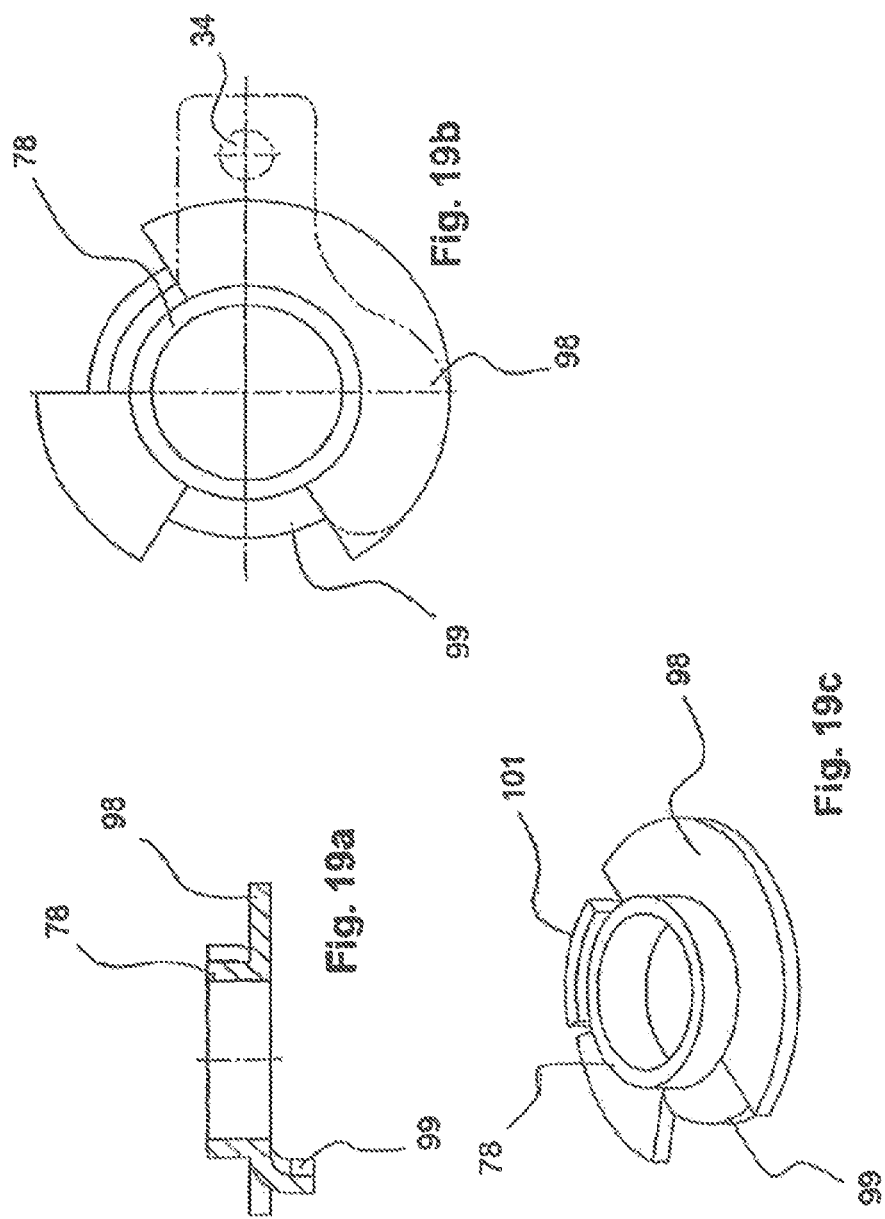

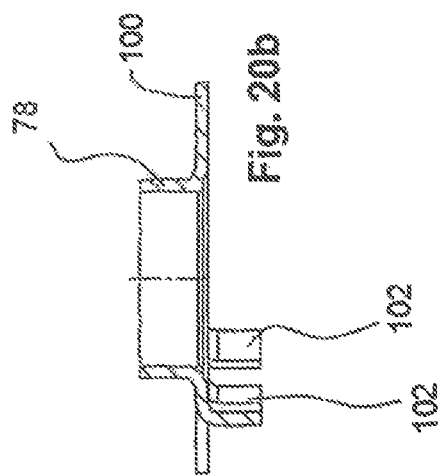
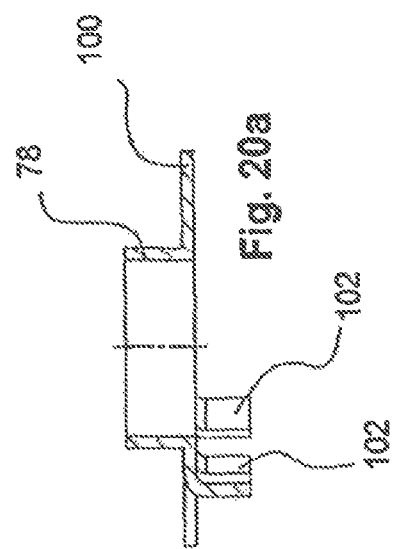
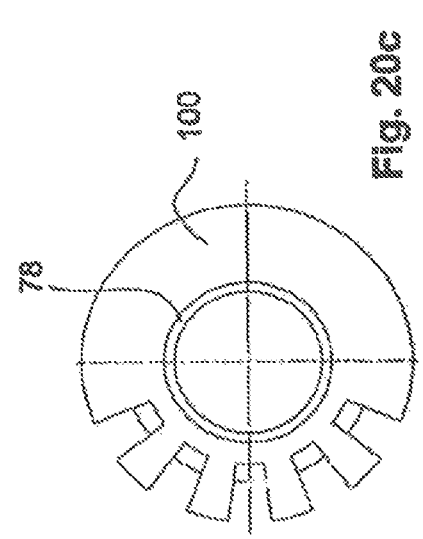

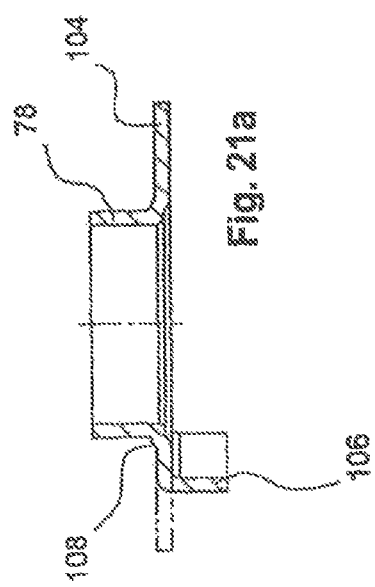
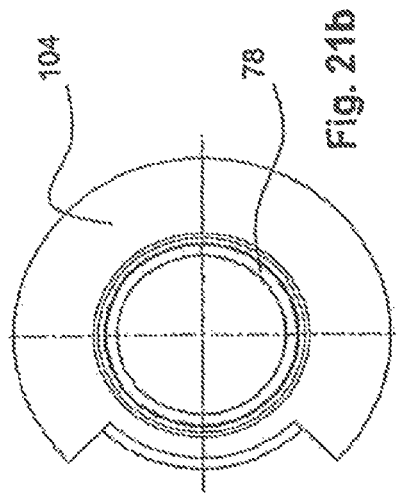
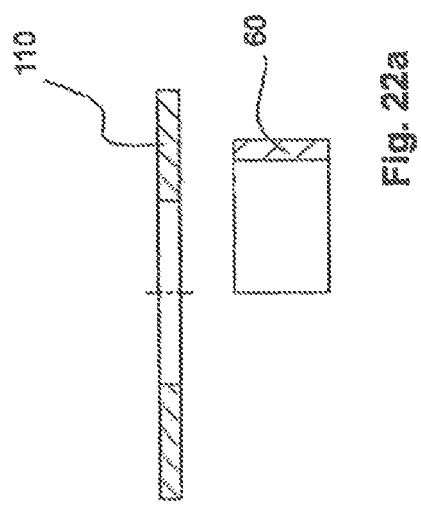
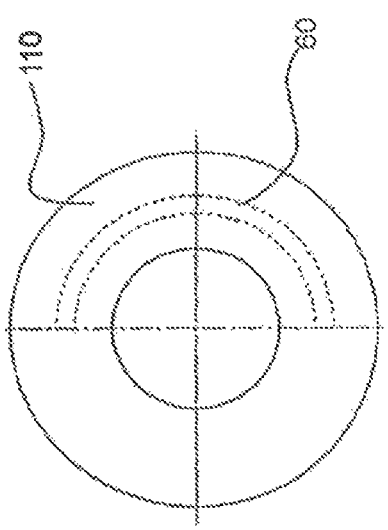

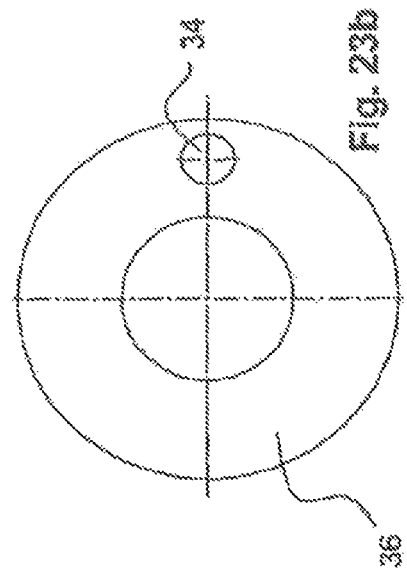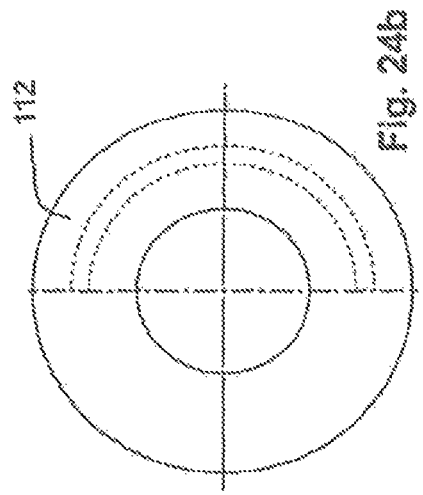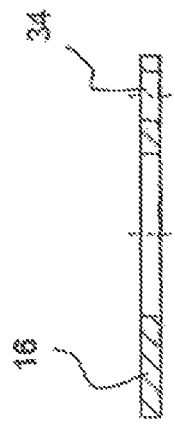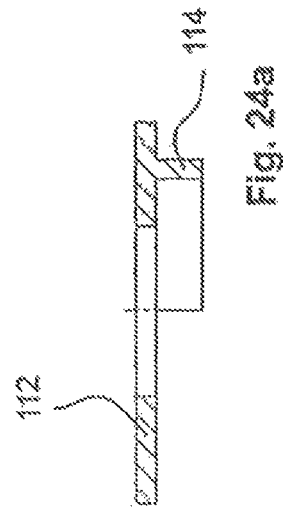
Fig. 23b
Fig. 24b
Fig. 23a
Fig. 24a

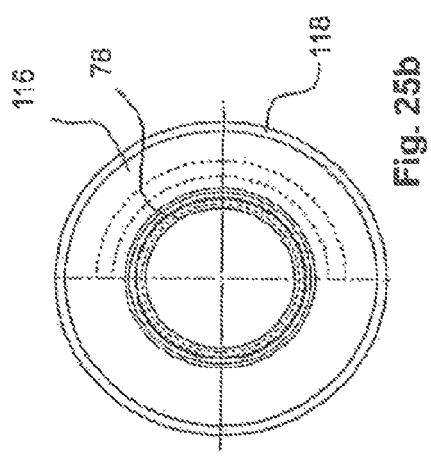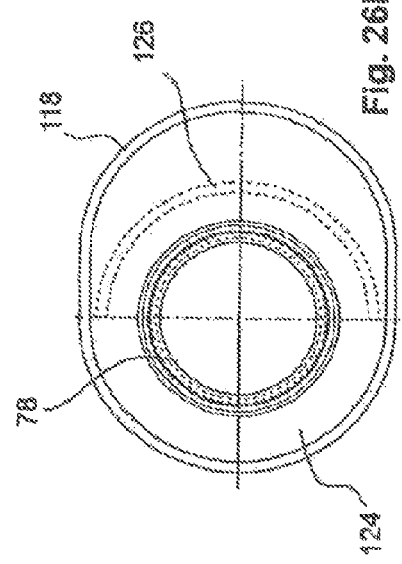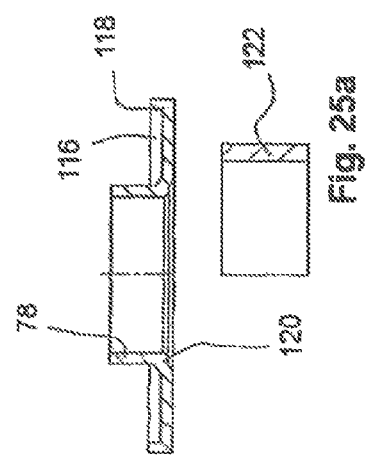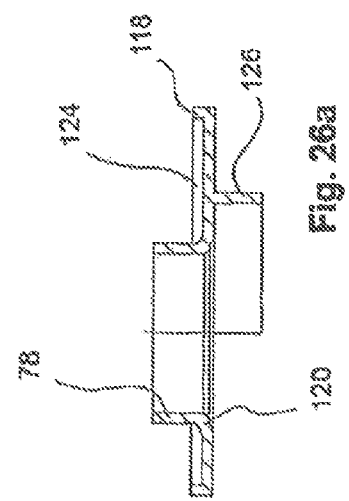

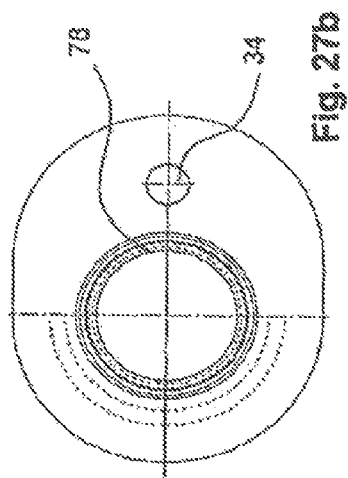
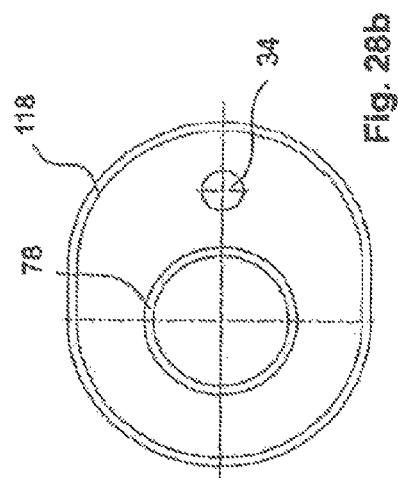
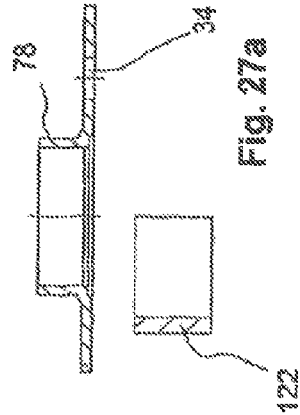
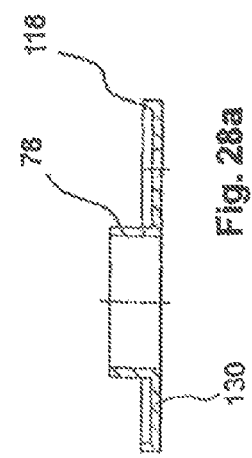

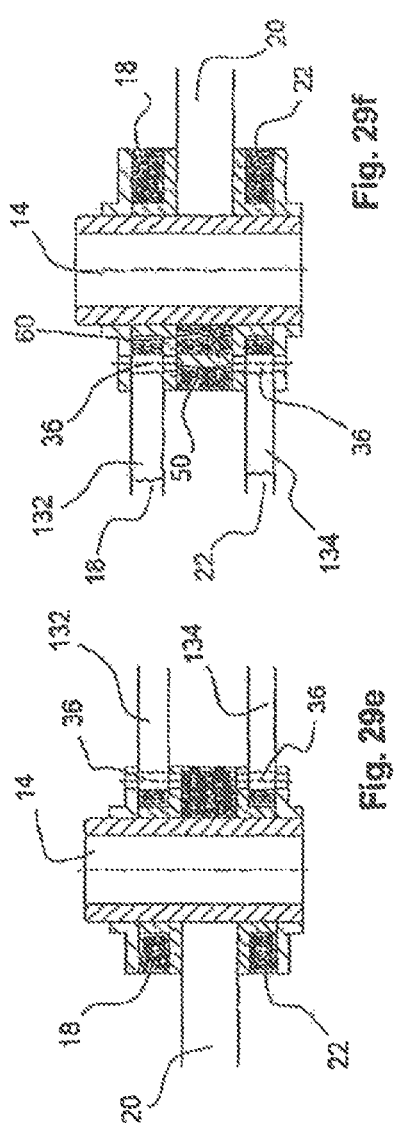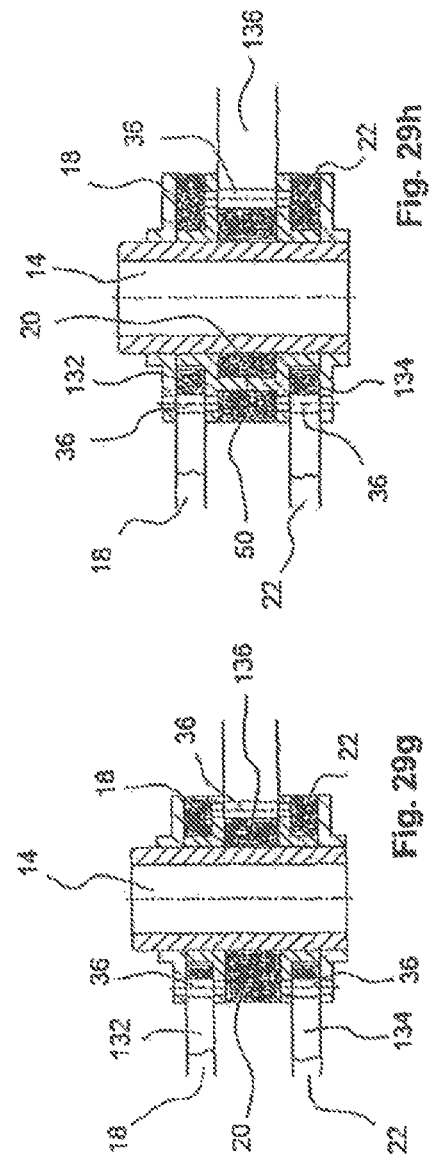

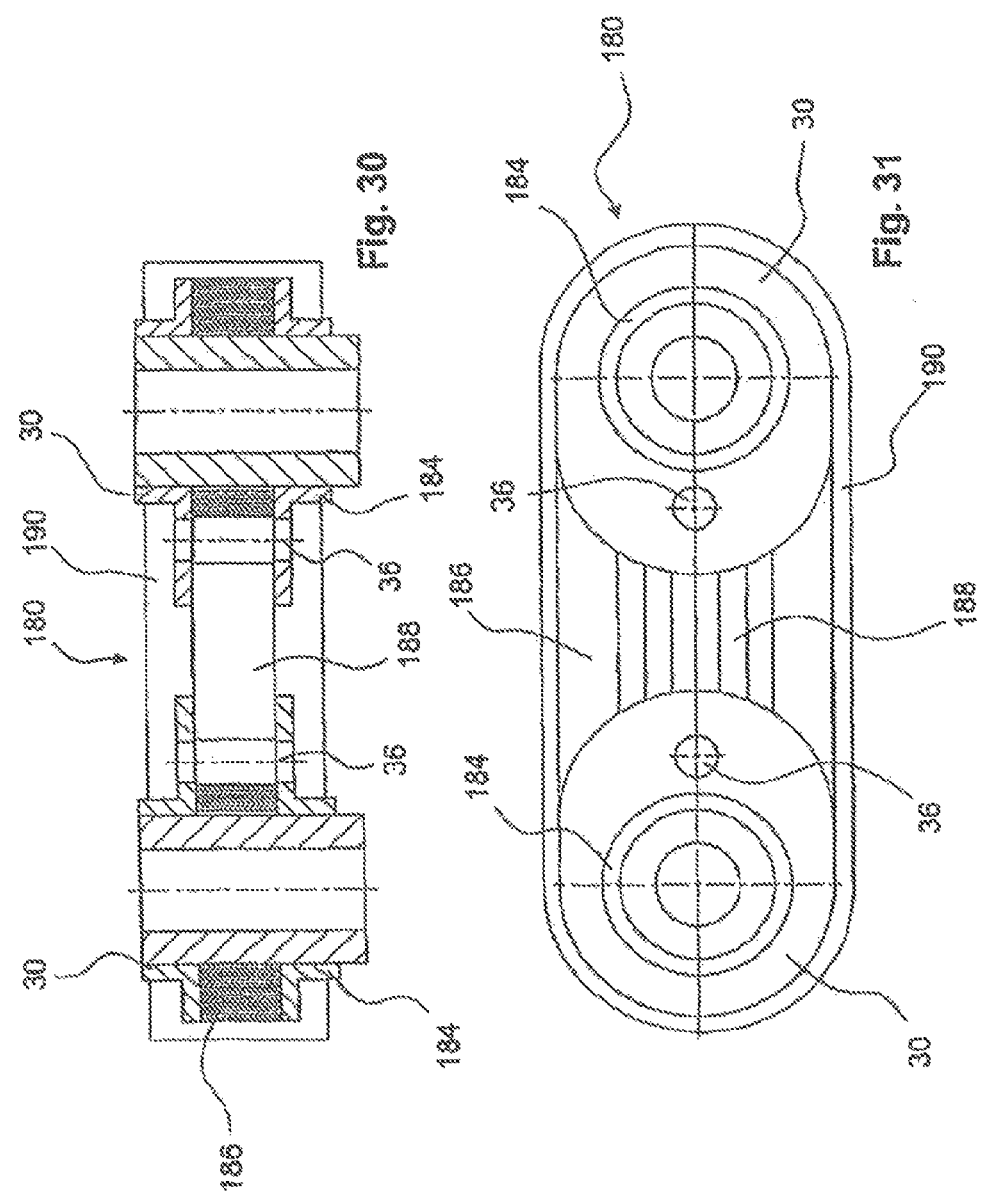

ELASTIC JOINT BODY

BACKGROUND

1. Technical Field

The present invention relates to an elastic joint body for a shaft arrangement for connecting two shaft portions in articulated manner, having a plurality of bushings, at least one primary loop bundle, each of which loops around a bushing pair which comprises two adjacent bushings and can be subjected to a tensile force in the event of a torque transmission via the shaft portions, a support device arranged on at least one bushing for axially guiding the primary loop bundle and a rubber-elastic casing in which the loop bundle, the support devices and the bushings are at least partially embedded.

2. Discussion of Related Art

An elastic joint body of this type is already known from the prior art. A joint disc is also referred to in this context, as is used for instance in a drive train of a motor vehicle or—on a smaller scale—in a steering column of a motor vehicle to connect two shaft portions in torque-transmitting manner. Joint discs of this type are advantageous in that, with good torque transmission properties and a long service life, they can effectively link cardanic movements of the two shaft portions to one another, and, to a certain extent, also to an axial displacement, whilst damping torsional vibrations. The advantages in terms of their service life and their torque transmission properties have also meanwhile resulted in such joint discs being increasingly used in industrial applications, for example for transmitting torques in large diesel engines.

Although previous joint discs have already been extensively optimised in terms of their service life and the maximum torque which can be transmitted in a continuous operation, there is essentially a need to further extend the service life and increase the amount of the maximum transmittable torque.

It is known from the prior art, DE 10 2008 047 596 A1, to guide loop bundles specifically around the bushings by means of support devices and to guide the portions extending away from the bushings such that setting actions which result over the course of the useful life of such a joint disc can be better monitored, thereby increasing the service life.

It is furthermore known from document DE 10 2008 047 596 A1 to provide auxiliary elements in the region between two bushings in order to also enable the loop bundles to be guided in this region. It is additionally or alternatively possible to also provide these auxiliary elements as stops which specify the maximum deformation in a portion of the joint body which is subjected to shear force.

The above measures are aimed in particular at extending the service life of the joint disc. However, they have not involved considerably increasing the maximum torque which can be transmitted in a continuous operation.

The present invention is aimed at developing a joint disc of the type mentioned at the outset in such a way that it is suitable for transmitting substantially higher torques.

SUMMARY

This object is achieved by an elastic joint body of the type described at the outset, in which provision is furthermore made for the adjacent bushings of at least some of the bushing pairs to be connected to one another in force-transmitting manner by way of at least one auxiliary loop bundle, wherein the at least one auxiliary loop bundle is arranged in the rubber-elastic casing in a region in which none of the primary loop bundles extends.

The elastic joint body can be constructed according to the invention as a joint disc, wherein the plurality of bushings is arranged in the circumferential direction at predetermined angular spacings with respect to a centre axis of the joint body and wherein a plurality of primary loop bundles is arranged so that at least two primary loop bundles, which are embedded at least partially in the rubber-elastic casing, loop in each case around each bushing.

The elastic joint body can be alternatively constructed as a connecting link, for example for a link coupling, wherein two bushings are provided, around which a primary loop bundle loops and which are additionally connected in force-transmitting manner by way of at least one auxiliary loop bundle.

It has been shown that it is possible to considerably increase the torque-transmission capability of such a joint body by providing auxiliary loop bundles in a region of the rubber-elastic casing in which none of the primary loop bundles extends. As is known, the critical regions for the torque transmission are, in particular, those regions of the joint body which are subjected to a tensile force during the torque transmission. In these regions, the primary loop bundles are almost exclusively load-bearing depending on the torque to be transmitted, because the material of the rubber-elastic casing plays barely any role in the transmission of tensile forces. If auxiliary loop bundles, which relieve the primary loop bundles, as it were, because the forces which are to be transmitted during the torque transmission are distributed to more loop bundles, namely the at least one primary loop bundle and the at least one auxiliary loop bundle, are provided in particular in these joint body portions which are subjected to a tensile force during the torque transmission, then this enables the transmission of altogether substantially higher tensile forces and therefore also considerably increased torques. The rubber-elastic casing is of negligible significance for the torque transmission precisely in this region which is subjected to a tensile force, which means that it is not detrimental for at least one auxiliary loop bundle to be additionally embedded in the rubber-elastic casing in the respective regions.

The force transmission between two bushings by way of at least one auxiliary loop bundle is particularly possible in that the two adjacent bushings are connected to one another by means of the support devices arranged respectively thereon by way of the at least one auxiliary loop bundle. With this, provision can be made for the support devices to be locally expanded or stretched for receiving simple fastening means for attaching the at least one auxiliary loop bundle. Therefore, local portions of the support devices can be provided, which are provided for attaching the respective auxiliary loop bundle. For example, it is possible to provide the bushings with collar elements of the support device, wherein these collar elements can serve for attaching force transmission elements thereto on which the auxiliary loop bundles are then suspended or act. Therefore, the force transmission to the bushings and thereby ultimately to the shaft portions connected to the bushings can be effected by means of the collar elements.

If the support devices of the two adjacent bushings are constructed for example so that a bearing pin can be arranged therein or connected thereto, the respective auxiliary loop bundle can be looped around the bearing pin and force can thus be transmitted to the respective bushing by way of the bearing pin and the support device. This can be achieved for example in that receiving openings, in which the bearing pins are more or less positively received, are provided in the respective collar elements.

Provision can be made here for two mutually parallel-extending bearing pins to be arranged on the support devices of the two adjacent bushings in each case, one or two mutually parallel-extending auxiliary loop bundles being looped around the said bearing pins. It is therefore possible to provide only one or even two or more bearing pins. In this context, it is possible to guide a respective auxiliary loop bundle around each bearing pin on a bushing and to likewise guide this auxiliary loop bundle around a complementary bearing pin on the adjacent bushing to enable a force transmission. However, it is alternatively possible to also use two or more bearing pins per bushing for attaching a single loop bundle which is then guided for example over the two or more bearing pins per bushing in desired manner.

There are various possibilities relating to the course of the auxiliary loop bundles between two adjacent bushings. One inventive variant provides for the at least one auxiliary loop bundle between two adjacent bushings to extend linearly in the tangential direction (with respect to a circle through all bushings of the joint body) or in the diametral direction or even in curved, preferably arcuately curved, manner with respect to the circumferential direction of the elastic joint body. Therefore, individual auxiliary loop bundles or a plurality of auxiliary loop bundles can be guided, as it were, parallel to one another and parallel to the at least one primary loop bundle between two adjacent bushings. However, it is alternatively also possible to guide these at an angle to an existing primary loop bundle or even in a curve relative thereto. The curvature can be directed radially inwards or radially outwards. An arcuate curvature enables, for example, the torque transmission characteristic of the joint body to have a kink or even a jump because, so long as the auxiliary loop bundle is not yet stretched, i.e. is still curved, its contribution to the torque transmission is, at the most, small. However, as soon as it is stretched, it can contribute substantially to the torque transmission.

A development of the invention provides for the at least one auxiliary loop bundle to be arranged inside a primary loop bundle. Therefore, the at least one auxiliary loop bundle can be arranged for example inside a primary loop bundle which is guided around two adjacent bushings. However, provision can be additionally or alternatively made for the at least one auxiliary loop bundle to surround a primary loop bundle, i.e. to be arranged radially outside this. Therefore, the at least one auxiliary loop bundle can be guided for example around two bushings and be arranged radially outside the primary loop bundle. In this context, it is possible for the at least one auxiliary loop bundle to be wound around a primary loop bundle, but to be separated from this in the region of at least one bushing by at least one separating element. This prevents the primary loop bundle and the auxiliary loop bundle from interacting in undesirable manner, for instance in such a way that individual textile loops of the auxiliary loop bundle mesh in the primary loop bundle over the course of the service life.

According to a development of the invention, it can be provided for the separating element to be integrally formed directly on the support device or formed by a separate component. It is possible here for the separating element to be of an arcuate construction and fixable on the support device. To fix it on the support device, fixing lugs, stops, feather edges, notched and angled portions of the support device, in particular of collar elements thereof and the like are possible.

A particularly high increase in the maximum transmissible forces can be achieved in that a plurality of auxiliary loop bundles are wound around a primary loop bundle, with each auxiliary loop bundle on a bushing being separated from the auxiliary loop bundle which is located radially further inwards on this bushing or from the primary loop bundle by a respective separating element. It can furthermore be provided according to the invention for the support device to have a plurality of collar elements of which it is comprised. Therefore, the support device can have, for example, a plurality of cross-sectionally L-shaped collar elements, with the support device being comprised thereof as required. As already indicated above, it can be provided in this context for the collar elements to be constructed with separating portions, acting as a separating element, for separating different primary loop bundles or auxiliary loop bundles from one another.

It is furthermore possible for the separating portions to be of a continuous or discontinuous construction.

BRIEF DESCRIPTION OF THE DRAWINGS

The invention is explained by way of example below, with reference to the accompanying figures which show:

FIG. 1 an overall view of a rubber-elastic joint body according to the invention, with the rubber-elastic casing cut away in the upper third of the illustration;

FIG. 2 an illustration of two adjacent bushings, cut free in a cross-sectional view to explain the position of the primary loop bundle and auxiliary loop bundle;

FIG. 3 the view corresponding to FIG. 2 in plan view;

FIG. 4 a view corresponding to FIG. 3 of a second embodiment of the invention;

FIG. 5 a view corresponding to FIG. 3 of a third embodiment of the invention;

FIG. 6 a view corresponding to FIG. 3 of a fourth embodiment of the invention;

FIG. 7 a view corresponding to FIG. 3 of a fifth embodiment of the invention;

FIGS. 8a and 8b views corresponding to FIGS. 2 and 3, respectively, of a sixth embodiment of the invention;

FIGS. 9a and 9b views corresponding to FIGS. 2 and 3, respectively, of a seventh embodiment of the invention;

FIGS. 10a and 10b views corresponding to FIGS. 2 and 3, respectively, of an eighth embodiment of the invention;

FIG. 11 a view corresponding to FIG. 3 of a ninth embodiment of the invention;

FIG. 12a is an embodiment of a collar in plan view;

FIGS. 12b and 12c are cross-sectional views taken along the section line of FIG. 12a;

FIG. 13a is another embodiment of a collar in plan view;

FIGS. 13b and 13c are cross-sectional views taken along the section line of FIG. 13a;

FIGS. 14a and 14b are views of the collar element according to FIGS. 2 and 3;

FIGS. 15a and 15b are views of another embodiment of a collar element;

FIGS. 17a-d are views of a still another embodiment of a collar element;

FIGS. 19a-19c are views of still another embodiment of a collar element;

FIGS. 20a-20c are views of another embodiment of a collar element including a plurality of notches;

FIGS. 21a and 21b are views of another embodiment of a collar element;

FIGS. 22a and 22b are views of yet another embodiment of a collar element;

FIGS. 23a and 23b are views of still another embodiment of a collar element;

FIGS. 24a and 24b are views of another embodiment of a collar element;

FIGS. 25a and 25b are views of yet another embodiment of a collar element;

FIGS. 26a and 26b are views of still another embodiment of a collar element;

FIGS. 27a and 27b are views of another embodiment of a collar element;

FIGS. 28a and 28b are views of yet another embodiment of a collar element;

DETAILED DESCRIPTION

Figure 16B:
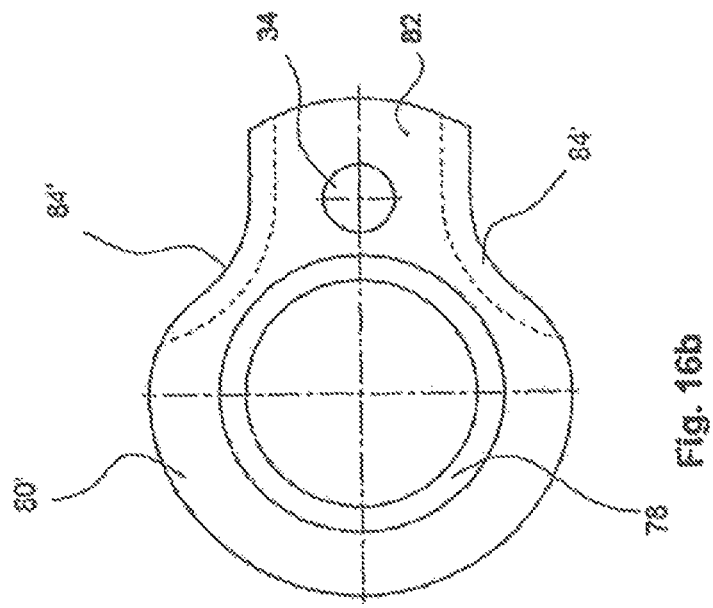
FIGS. 16a and 16b are views of a yet another embodiment of a collar element.

FIG. 1 shows a partially broken-away plan view of an elastic joint body 10 according to the invention, having six bushings 14 surrounded by a rubber-elastic casing 12. The bushings 14 are arranged in predetermined angular portions of the joint body 10 in the circumferential direction with respect to a centre axis M in such a way that their centre points are located on a circular path K. In that region of the joint body according to FIG. 1 which is shown cut away in the drawing, it is possible to see the collar elements 16 on the bushings 14, which are arranged for axially supporting the loop bundles 18, 20 and 22. FIG. 1 further shows that, on the collar elements 16, two respective pegs 24 are received in receiving openings 26 in the regions which face one another. A respective auxiliary loop bundle 28, which extends inside the loop bundle 18, 20, 22, is guided around each of these pegs 24.

FIG. 1 moreover shows that a plurality of loop bundles 18, 20, and 20, 22 loops around each individual bushing 14. Provision can be made here for the loop bundles 18, 22, for instance, to be subjected to tensile force in a state in which the joint body 10 is incorporated in a shaft arrangement and a drive torque is effectively transmitted between the shaft portions as a result of a clockwise rotation, whilst the loop bundle 20 together with the region of the rubber casing 12 which surrounds these loop bundles do not transmit any tensile force but are instead subjected to compressive force. If the direction of rotation changes for example when a motor vehicle is in overrun mode, the loop bundle 20 is subjected to a tensile force and the loop bundles 18, 22 are subjected to compressive force. The arrangement of the auxiliary loop bundles will be discussed in particular below.

FIG. 2 shows the two adjacent bushings 14. Readily modified collar elements 30 are pushed or pressed positively thereon. The collar elements 30 have stretched portions 32 in their mutually facing regions. Respective openings 34, into which pins 36 are inserted, are provided in these stretched portions 32 on the centre line L. The pins 36 have end portions whereof the diameter is slightly reduced and which are received with an exact fit in the openings 34. Their centre regions are designed with a somewhat larger diameter to produce a diameter step (shoulder) with which they lie in each case against the collar elements 30 around the openings 34 to support the collar elements 30. However, in an alternative construction, the pin ends can also extend axially beyond the collar elements 30, i.e. they can project slightly from the bore 34. The auxiliary loop bundle 28 is guided around the pins 26. This auxiliary loop bundle extends radially inside the primary loop bundle 20 which is wound around the two bushings 14. It can be seen that the loop bundles 28 extend substantially parallel to one another in the region between the two bushings 14. Both are stretched and are subjected synchronously to stress when tensile loads occur.

Further developments of the invention will be explained below, with the same components as those described above being denoted by the same reference numerals. As regards their operation and construction, please refer to the description above.

FIG. 4 shows a modification of the embodiment according to FIG. 3. The two receiving openings 34 are no longer arranged on the centre line L but are offset by a spacing d from the centre line L. The loop bundle 40 is furthermore also not embedded in stretched manner in the rubber-elastic casing, but has an arcuate course, which is more precisely directed radially inwards, relative to the circle of curvature K (see also FIG. 1 of the joint body) on which the centre points of the bushings 14 lie. Alternatively, the arcuate course can also be directed radially inwards. In both cases, this means that the auxiliary loop bundle 40 is not stretched in the unloaded starting state and only contributes to the tensile-force transmission between the two bushings 14 according to FIG. 4 minimally—on account of it being embedded in the rubber-elastic casing. However, increasing tensile stress produces a more or less stretched state of the auxiliary loop bundle 40, with the result that its contribution to the tensile-force transmission increases.

FIG. 5 shows a further modification of the embodiment according to FIG. 3. This shows that the two pins 36 are alternately offset relative to the centre line L, in each case by the spacing d. This results in the auxiliary loop bundle 42, which is in any case already stretched in the unloaded starting state shown in FIG. 5, extending at an angle to the primary loop bundle 20. Nevertheless, as the tensile load increases in this region, the loop bundle 42 comes closer to a parallel alignment of the outer primary loop bundle 20 and the contribution of the auxiliary loop bundle 42 to the tensile-force transmission thereby increases continuously.

FIG. 6 shows a further embodiment of the invention, in which two pins 36 are provided for each collar element 30. A loop bundle 44 is wound around these pairs of retention pins 36 so that it extends relatively close to the primary loop bundle 20 and substantially parallel thereto. This variant embodiment, in which the loop bundle 44 is already stretched in the starting state, also results in the tensile forces being distributed to the primary loop bundle 20 and the auxiliary loop bundle 44 directly as a tensile load is initiated.

FIG. 7 shows an embodiment in which two pins 36 are in turn attached for each bushing 14 and corresponding collar elements 30. Contrary to FIG. 6, in which only one auxiliary loop bundle 44 loops around the total of four pins, two auxiliary loop bundles 46, 48 are provided inside the primary loop bundle 20, which auxiliary loop bundles are guided substantially parallel to one another and to the primary loop bundle 20 around the pins 26 and therefore contribute to a tensile force transmission. By comparison with the embodiment according to FIG. 6, the embodiment according to FIG. 7 enables even greater tensile forces to be transmitted.

FIGS. 8a and 8b deviate from the embodiments described above with reference to FIGS. 2 to 7 in terms of the attachment of the auxiliary loop bundle. Therefore, according to this variant embodiment, it is provided for an auxiliary loop bundle 50 to be guided radially outside the primary loop bundle 20. To this end, constructed on the collar elements 52 in the region of the of the adjacent radially remote sides, there is a respective separating portion 54 which separates the primary loop bundle 20 wound around the bushing 14 from the auxiliary loop bundle 50. FIG. 8a shows that the two collar elements 52 are of a symmetrical construction to produce a type of joint 56 at which the two separating elements or separating portions 54 abut against one another. It is alternatively also possible to associate the one separating element 54 with only one collar element 52 and to construct this over the entire height of the primary loop bundle 20 so that the joint is positioned on the underside of one of the two collar elements.

FIGS. 9a and 9b show the embodiment according to FIGS. 8a and 8b, but with a separate separating element 60. This is placed around the primary loop bundle 20 and, if required, can be fixed on the collar elements 52.

On the basis of the embodiment according to FIGS. 9a, b, FIGS. 10a and 10b show a further-developed embodiment with a primary loop bundle 20, a first auxiliary loop bundle 50 and a second auxiliary loop bundle 62, wherein the auxiliary loop bundles are separated from one another and the first auxiliary loop bundle 50 is separated from the primary loop bundle 20 by respective separating elements 60, 64. As in the embodiment according to FIG. 9b, the separating elements 60, 64 are metal or plastic bodies of an arcuate construction, which prevent the individual thread loops of the loop bundles from meshing with one another.

FIG. 11 shows an embodiment which represents a combination of the embodiment according to FIGS. 9a, 9b and the embodiment according to FIG. 6. It can be seen that, in this embodiment, a first auxiliary loop bundle 44 is provided around the pin pair 36 of each collar element 30, radially inside the primary loop bundle 20. A second auxiliary loop bundle 50 is guided radially outside around the primary loop bundle 20, with a separating element 60 again being provided as described with reference to FIGS. 8a, b and 9a, b. This arrangement also enables the tensile-load transmission capacity to be increased by comparison with the embodiment according to FIGS. 9a, b and by comparison with the embodiment according to FIG. 6.

Starting from the embodiment according to FIGS. 10a and 10b, FIGS. 12a to 12c and 13a to 13c show how cutouts 66, in which the separating elements 60 and 64 engage, are provided on the collar element 52. FIGS. 12b and 12c show two alternatives here. According to the embodiment according to FIG. 12b, the separating element has a projection 68 with a barb 70 which enables the separating element 60 to be inserted into the cutout 66 by way of the projection 68 and to be fixed in position on the collar element 52 by the barb 70. FIG. 12c shows the variant in which the projection is inserted into the cutout 66 without the barb. Both variants show that it is possible to couple the separating elements 60 and 64 to the collar element 52 in pre-positioning manner.

In the embodiment according to FIGS. 13 to 13c, it is possible to see that the separating elements are guided up to the edge 72 of the collar element 52 and are hooked to the edge of the collar element 52 by way of corresponding projections 74 and projections with a barb 76. This also enables the separating elements 60 and 64 to be coupled to the collar element.

FIGS. 14a and 14b show the collar element as it is used in the embodiment according to FIGS. 2 and 3. It can be seen that the collar element has a flange 78 with which it can be attached to the bushing. The widened region 32 and the opening 34 are furthermore shown.

FIGS. 15a, b show a modification of the collar element, which is denoted here by 80. It can be seen here that the widened region 82 is provided with flanks 84 having laterally concave incisions. As a result, the axial support of the primary loop bundle 20 is no greater than in a conventional joint disc arrangement, which means that a mutual cardanic movement between the adjacent bushings is not too greatly restricted.

Figure 16A:
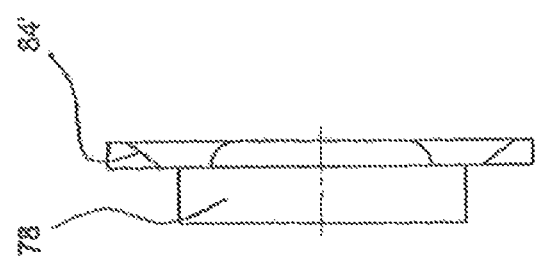

FIGS. 16a and 16b show the variant embodiment according to FIGS. 15a and 15b, but with flanks 84' chamfered therein. This also enables local loads on the primary loop bundle 20 to be reduced in the event of cardanic stress.

FIGS. 17a to 17d show an embodiment based on the embodiments according to FIGS. 15a, b and 16a, b. In these, the collar element 86 is designed such that its contour is similar to that of the embodiment according to FIGS. 14a, b. However, to achieve correspondingly more angled flanks 88, the outer regions 90 are bent outwards so that it is also possible to prevent the flexibility from becoming impaired in the event of cardanic loads.

Figure 18A:
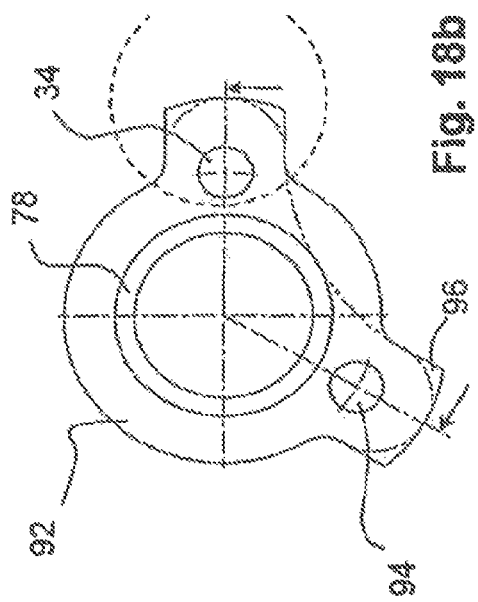
FIGS. 18a and 18b are views of another embodiment of a collar element.
Figure 18C:
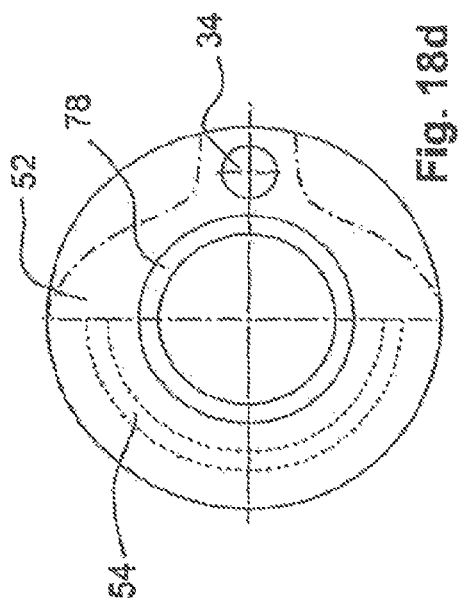
FIGS. 18c and 18d are views of yet another embodiment of a collar element.
Figure 18B:
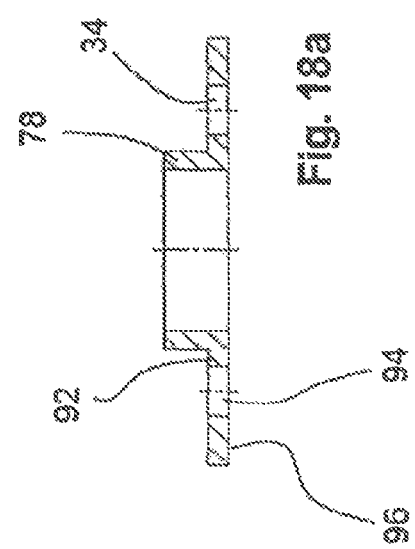

The embodiment according to FIGS. 18a and 18b shows that it is also possible to arrange auxiliary loop bundles on a series of adjacent bushings. It is also evident here that the collar element 92 as seen on the right in FIG. 18b is constructed in the same manner as shown for instance in FIGS. 15a, b. Accordingly, the collar element 92 is however also provided with a receiving opening 94 and a correspondingly widened portion 96 on the bushing following in the other direction, so that a pin can also be arranged in the opening 94 in this direction and an auxiliary loop bundle can be attached. The dash-dot-dot line in FIG. 18b also shows that the outer contour of the respective collar element 52 can have a different construction, in particular in that it can be reduced, in order to facilitate cardanic movements.

Figure 18D:
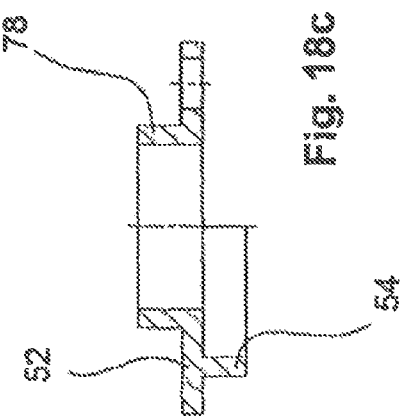

FIGS. 18c and 18d show an embodiment in which, similar to the illustration of FIGS. 8a and 8b, the separating element 54 is integrally formed on the collar element 52. An additional option can furthermore be to provide a further opening 34 for attaching a further auxiliary loop bundle. It is again evident from the dash-dot-dot line in FIG. 18d that the outer contour of the respective collar element 92 can also be reduced to facilitate cardanic movements.

The embodiment according to FIGS. 19a to 19c shows a collar element 98 with various downwardly and upwardly angled notches 99, 101 which can each be used to mount auxiliary loop bundles. The support face 99 serves for structurally separating the primary and auxiliary loops for the tensile sections, the support face 101 for structurally separating the primary and auxiliary loops for the compressive sections as a variant to the embodiments according to FIGS. 8a, b and 9a, b. Here, the downwardly folded support face 99 serves as a separating element with respect to the bushing following to the right and the upwardly folded support face 101 serves as a separating element with respect to the bushing following to the left. The bore 34 is provided for receiving the bearing pin of the inner auxiliary loop.

FIGS. 20a to 20c also show a collar element 100 having a plurality of notches 102 which can then serve as separating elements between a primary loop bundle and an auxiliary loop bundle.

FIGS. 21a and 21b show a collar element 104 according to an embodiment having a notch 106 which is bent downwards and can be used as a separating element for separating a primary loop bundle from a secondary loop bundle. It is furthermore shown that the flange 78 merges into the disc-shaped collar element 104 by means of a loop-protecting rounded portion 108.

FIGS. 22a and 22b show the embodiment as used in the variant according to FIGS. 9a and 9b, but slightly modified. In this, the collar element 110 is constructed in a disc shape without a flange. The separating element 60 is a plate constructed in an approximately semi-circular shape and is formed as a separate component.

FIGS. 23a and 23b show an embodiment of the collar element 16 as shown in FIG. 1. FIGS. 24a and 24 b show, in an exploded view, an embodiment corresponding to the variant embodiment according to FIGS. 8a and 8b, but without the flange 78. The collar element 112 is constructed in the shape of a disc and has a semi-circular separating element 114 integrally formed thereon.

FIGS. 25a, 25b show a variant embodiment of a collar element 116 whereof the radial outer contour 118 is bent upwards in a cup shape. This collar element has a flange 78 which projects over a rounded region 120 out of the collar element 116. A separately constructed separating element 122 is moreover provided, which has an approximately semi-circular course.

The embodiment according to FIGS. 26a, b corresponds to the embodiment according to FIGS. 25a, b, but the collar element 124 thereof is of a somewhat stretched construction. The separating element 126 is furthermore integrally formed on the collar element 124.

The embodiment according to FIGS. 27a and 27b corresponds to the embodiment according to FIGS. 25a, b, although an opening 34 is additionally provided. The separating element 122 is optionally radially outside a primary loop bundle for the purpose of attaching a further auxiliary loop bundle.

The embodiment according to FIGS. 28a and 28b corresponds to the embodiment according to FIGS. 27a and 27b, although with upwardly bent outer contour regions 118. Furthermore, the flange 78 projects unrounded out of the collar element 130.

Figure 29A:
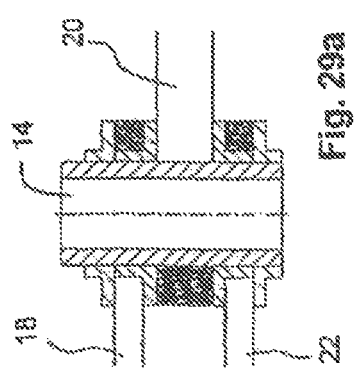
FIG. 29a-s various embodiments of the invention in a cross-sectional view of a bushing shown by way of example, and FIGS. 30 and 31 an embodiment of the invention as a connecting link.
Figure 29B:
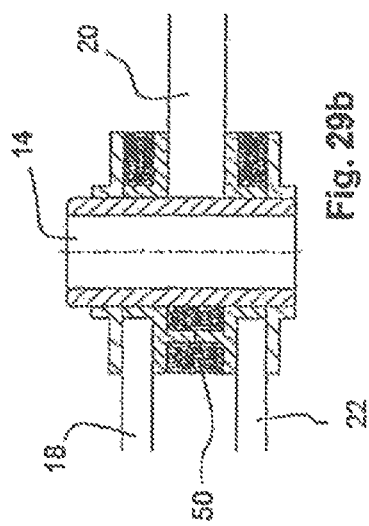
Figure 29C:
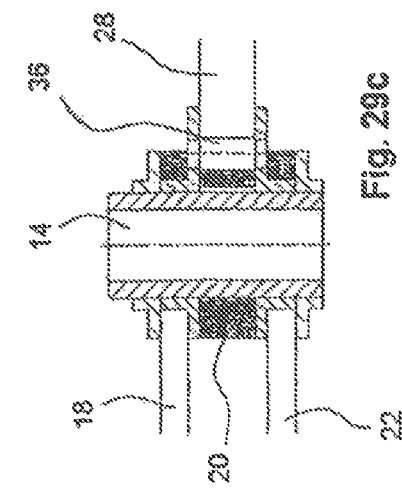
Figure 29D:
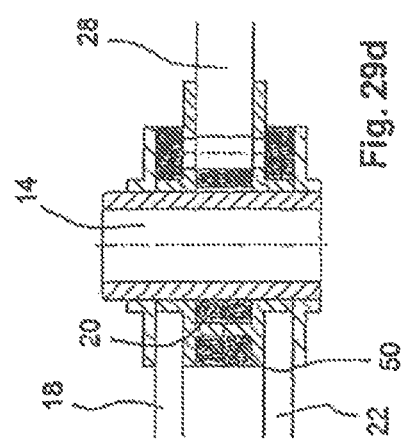
Figure 29I:
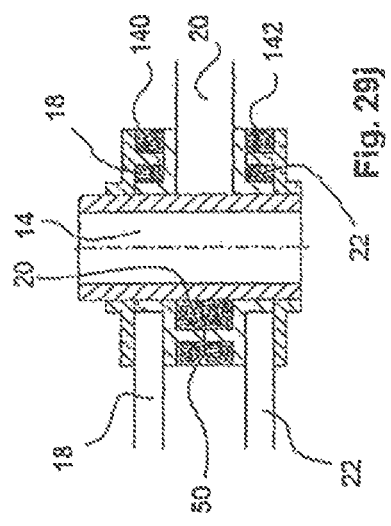
Figure 29J:
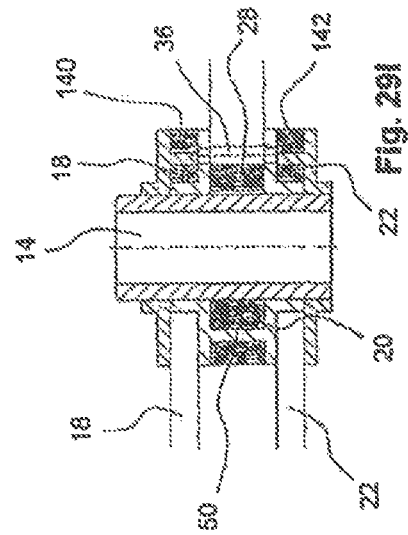
Figure 29L:
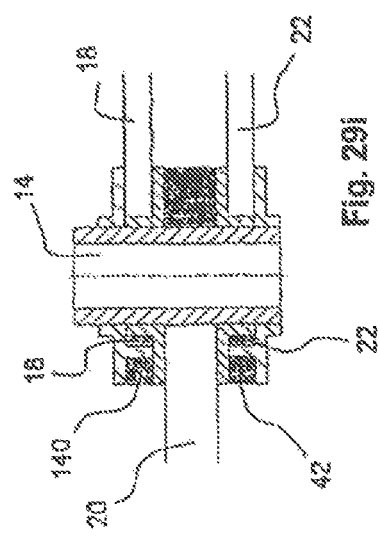
Figure 29K:
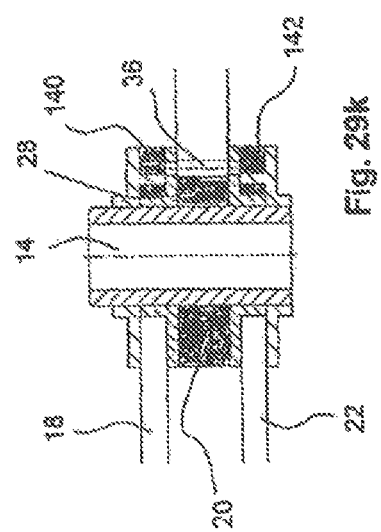
Figure 29M:
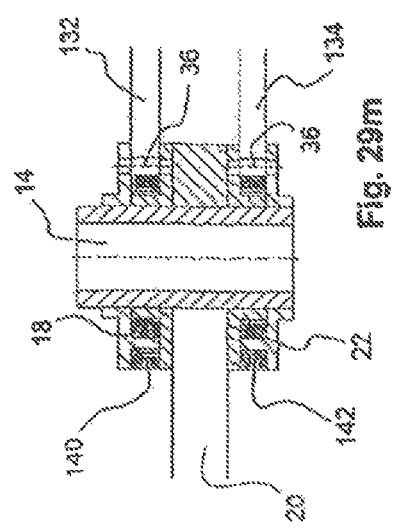
Figure 29N:
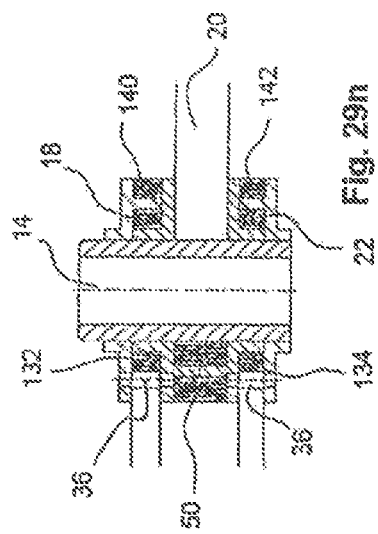
Figure 29O:
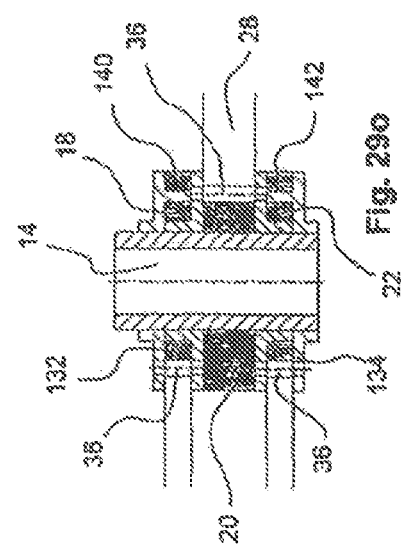
Figure 29P:
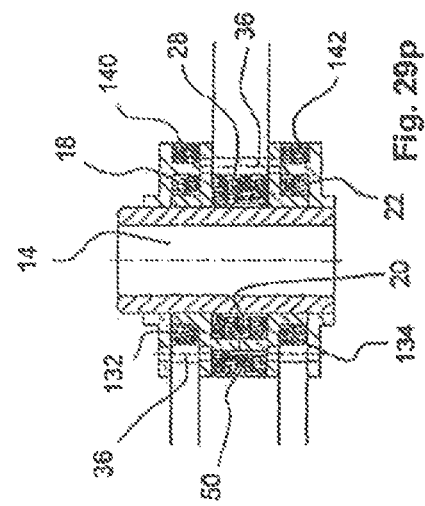

FIGS. 29a to 29p show different variants for mounting primary loop bundles and auxiliary loop bundles on a collar bushing 14. In these, a plurality of different collar elements are used, as have been described above, and the entire support device is comprised of this individual collar element. In some of these embodiments, simple cross-sectionally L-shaped collar elements are used on the axial ends in each case. Other embodiments have collar elements which are of a more complex construction and which have been explained in detail above.

FIG. 29a shows a simple construction in which a primary loop bundle is arranged in the tensile section on a collar element in a manner known per se in a certain load situation, and two loop bundles 18, 22 are arranged in a portion which is subjected to pressure.

FIG. 29b shows that, in the tensile section, a further auxiliary loop bundle 50 is arranged near to the primary loop bundle 20. The arrangement corresponds to the arrangement according to FIGS. 8a, 8b.

FIG. 29c shows the variant in which a further secondary loop bundle 28 is provided parallel to the primary loop bundle 20 over the pins 36, as shown for instance in FIG. 3.

FIG. 29d shows the embodiment with an inner auxiliary loop bundle 28 and an outer auxiliary loop bundle 50 in addition to the primary loop bundle 20, as this embodiment is shown for instance in FIG. 11.

FIG. 29e shows a variant embodiment in which two auxiliary loop bundles 132, 134 are arranged over pins radially inside primary loop bundles 18, 22.

FIG. 29f shows a variant embodiment in which, in addition to the primary loop bundles 18, 22, auxiliary loop bundles 132, 134 are provided over pins 36. Furthermore, in addition to the primary loop bundle 20 corresponding to the embodiment according to FIGS. 9a, 9b, an auxiliary loop bundle 50 is provided, separated by a separating element 60.

FIG. 29g shows an alternative to the embodiment according to FIG. 29f, in which an auxiliary loop bundle 136 is guided over a pin 36 parallel to the primary loop bundle 20 on the inside thereof. Reference is moreover made to the explanation for FIG. 29f.

FIG. 29h shows a synthesis of the embodiments of FIGS. 29f and 29g, wherein, in addition to the primary loop bundle 20, an auxiliary loop bundle 136 is provided radially inside over the pins 36 and a further auxiliary loop bundle 50 is provided radially outside the primary loop bundle 20. Reference is moreover made to the description of FIGS. 29f, g.

FIG. 29i shows a variant embodiment in which auxiliary loop bundles 140, 142 are provided radially outside the primary loop bundles 18, 22.

FIG. 29j shows a variant embodiment which starts with the variant embodiment according to FIG. 29i, but in which an auxiliary loop bundle 50 surrounding the primary loop bundle 20 is provided in addition to this latter.

FIG. 29k shows a variant embodiment corresponding to FIG. 29i, but in which the auxiliary loop bundle, which is associated with the primary loop bundle 20 and extends parallel thereto, is arranged radially inside over the pin 36.

FIG. 29l shows a combination of the embodiments according to FIGS. 29j and 29k, in which the auxiliary loop bundle 50 is provided radially outside the primary loop bundle 20 and the auxiliary loop bundle 28 is provided radially inside the primary loop bundle 20.

FIG. 29m shows a variant embodiment in which, parallel to the primary loop bundles 18, 22, the auxiliary loop bundles 132, 134 are provided radially inside over pins 36 and the auxiliary loop bundles 140, 142 are provided radially outside.

FIG. 29n shows an embodiment starting from the embodiment according to FIG. 29m, in which the secondary loop bundle 50 is provided in addition to the primary loop bundle 20.

FIG. 29o shows the variant embodiment according to FIG. 29m, in which, in addition to the primary loop bundle 20, the auxiliary loop bundle 28 is provided radially inside over the pins 36.

FIG. 29p shows a combination of the embodiments according to FIGS. 29n and 29o, in which auxiliary loop bundles 140, 142 and 50 are provided radially outside, both parallel to the primary loop bundles 18 and 22 and parallel to the primary loop bundles 20, and auxiliary loop bundles 132, 134 and 28 are provided radially inside over pins 36.

Figure 29R:
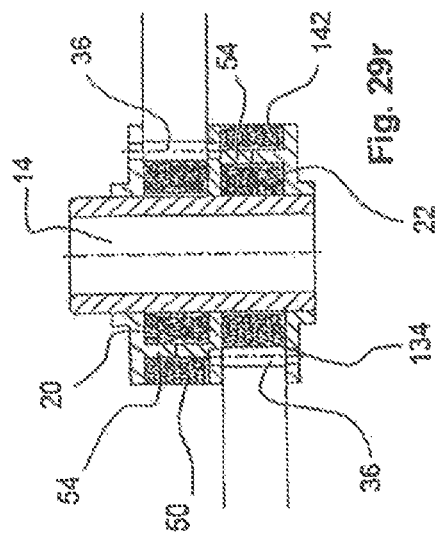
Figure 29Q:
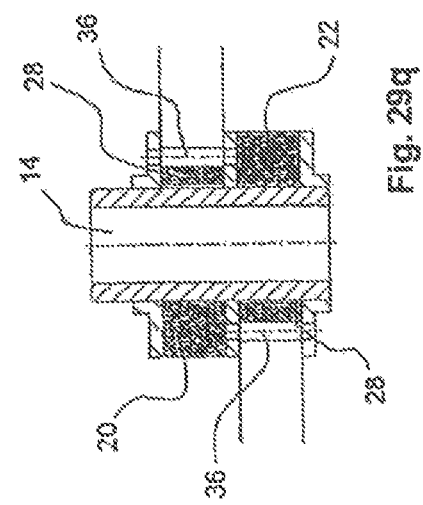

FIG. 29q shows a variant in which, in an actual torque transmission situation, a respective primary loop bundle 20, 22 is provided for each tensile-load section and compressive-load section, with a respective auxiliary loop bundle 28 being arranged over pins 36 in each of these primary loop bundles 20, 22.

FIG. 29r shows a variant in which, starting with the variant according to FIG. 29q, a respective further auxiliary loop bundle 50 and 142 is provided in addition to the primary loop bundles 20, 22 and to the auxiliary loop bundles 28 arranged radially inside these latter. These further auxiliary loop bundles 50 and 142 are separated from the primary loop bundles 20, 22 by separating portions 54 integrally formed on the collar elements.

Figure 29S:
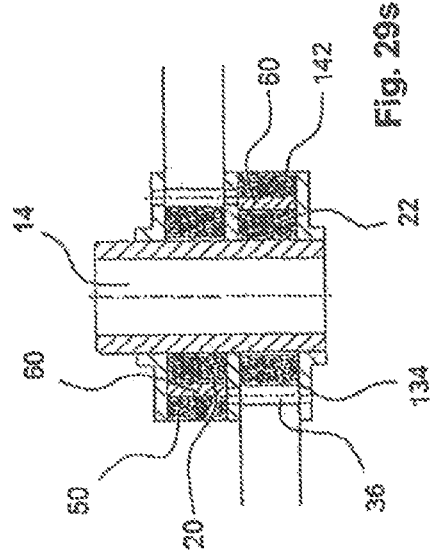

FIG. 29s shows a variant corresponding to the variant according to FIG. 29r, in which the separating portions 54 are replaced by separate separating elements 60.

FIGS. 30 and 31 show an embodiment of the invention in which the joint body is not constructed as a joint disc with a plurality of bushings arranged along a circle, but as a single connecting link 180 with only two bushings 184 which—in a manner similar to that shown for two adjacent bushings of a joint disc in FIG. 3 and described in detail above—have a primary loop bundle 186 looped around them and an auxiliary loop 188 additionally arranged between them. Connecting links 180 of this type are used for example in so-called link couplings, i.e. couplings in which two coupling parts are coupled by way of such links, which are constructed as separate components, for the purpose of torque transmission. The connecting link according to FIGS. 30 and 31 demonstrates the advantages outlined, as have been described in detail above with reference to a connection between two adjacent bushings in a joint disc. In the case of the connecting link 180 according to this embodiment, it is also provided for the primary loop bundle 186 and the auxiliary loop bundle 188 to be embedded in the rubber-elastic elastomeric body 190.

The above description shows that any combinations of the various primary and auxiliary loop bundle variants according to the present invention are possible to achieve an arrangement for constructing a joint body in individual regions, in the case of a joint disc, or around its entire circumference or, in the case of a connecting link, along its longitudinal extent for transmitting relatively high tensile forces. Depending on requirements, corresponding auxiliary loop bundles can be provided in the rubber-elastic casing in individual joint body portions or around its entire circumference or along its longitudinal extent in addition to the primary loop bundles which are present in any case, which auxiliary loop bundles considerably increase the tensile-stress limit and therefore create a joint body which is suitable for transmitting relatively high torques.

It goes without saying that, within the framework of the present invention, the numerous concepts outlined above can be combined in any way and the joint body can therefore be adapted to specific requirements and designed accordingly.

The invention claimed is:

1. An elastic joint body for a shaft arrangement for connecting two shaft portions in articulated manner, comprising:
   a plurality of bushings;
   at least one primary loop bundle, each of which loops around a bushing pair which comprises two adjacent bushings and can be subjected to a tensile force in the event of a torque transmission via the shaft portions;
   a support device arranged on at least one bushing for axially guiding the primary loop bundle;
   a rubber-elastic casing in which the primary loop bundle, the support devices and the bushings are at least partially embedded, wherein at least one auxiliary loop bundle is attached to the support device, wherein the adjacent bushings of at least some of the bushing pairs are connected to one another in force-transmitting manner by way of the support devices respectively arranged on the bushings and by way of the at least one auxiliary loop bundle, wherein the at least one auxiliary loop bundle is arranged in the rubber-elastic casing in a region in which none of the primary loop bundles extends; and
   a respective bearing pin, around which the auxiliary loop bundle loops, is arranged on the support devices of the two adjacent bushings.

2. The elastic joint body according to claim 1, wherein the support devices are locally stretched to receive fastening means for attaching the at least one auxiliary loop bundle.

3. The elastic joint body according claim 1, further comprising two mutually parallel-extending bearing pins, around which one or two mutually parallel-extending auxiliary loop bundles loop, are arranged on the support devices of the two adjacent bushings in each case.

4. The elastic joint body according to claim 1, wherein the at least one auxiliary loop bundle extends linearly in a tangential or in a diametral direction or in a curved-manner between two adjacent bushings with respect to a circumferential direction of the elastic joint body.

5. The elastic joint body according to claim 4, wherein the at least one auxiliary loop bundle extends linearly in an arcuately curved manner between two adjacent bushings with respect to a circumferential direction of the elastic joint body.

6. The elastic joint body according to claim 1, wherein the at least one auxiliary loop bundle is arranged inside a primary loop bundle.

7. The elastic joint body according to claim 1, wherein the at least one auxiliary loop bundle surrounds a primary loop bundle.

8. The elastic joint body according to claim 7, wherein the at least one auxiliary loop bundle is wound around a primary loop bundle, but separated from this in a region of at least one bushing by means of at least one separating element.

9. The elastic joint body according to claim 8, wherein the separating element is integrally formed directly on the support device or is formed by a separate component.

10. The elastic joint body according to claim 8, wherein the separating element is of an arcuate construction and can be fixed on the support device.

11. The elastic joint body according to claim 8, wherein a plurality of auxiliary loop bundles are wound around a primary loop bundle, wherein each auxiliary loop bundle on a bushing is separated at least in portions from the auxiliary loop bundle located radially further inwards on this bushing or from the primary loop bundle by a respective separating element.

12. The elastic joint body according to claim 1, wherein the support device has a plurality of collar elements of which it is comprised.

13. The elastic joint body according to claim 12, wherein the collar elements are constructed with separating portions acting as a separating element for separating different primary loop bundles or auxiliary loop bundles from one another.

14. The elastic joint body according to claim 13, wherein the separating elements are of a continuous or discontinuous construction.

15. The elastic joint body according to claim 1, wherein the elastic joint body is constructed as a joint disc, wherein the plurality of bushings are arranged in a circumferential direction at predetermined angular spacings with respect to a centre axis of the joint body and wherein a plurality of primary loop bundles is arranged such that at least two primary loop bundles, which are at least partially embedded in the rubber-elastic casing, loop respectively around each bushing.

16. The elastic joint body according to claim 1, wherein the elastic joint body is constructed as a connecting link, wherein two bushings are provided around which a primary loop bundle loops and which are additionally connected in force-transmitting manner by way of at least one auxiliary loop bundle.

17. An elastic joint body for a shaft arrangement for connecting two shaft portions in articulated manner, comprising:
   a plurality of bushings;
   at least one primary loop bundle, each of which loops around a bushing pair which comprises two adjacent bushings and can be subjected to a tensile force in the event of a torque transmission via the shaft portions;
   a support device arranged on at least one bushing for axially guiding the primary loop bundle;
   a rubber-elastic casing in which the primary loop bundle, the support devices and the bushings are at least partially embedded, wherein at least one auxiliary loop bundle is attached to the support device, wherein the adjacent bushings of at least some of the bushing pairs are connected to one another in force-transmitting manner by way of the support devices respectively arranged on the bushings and by way of the at least one auxiliary loop bundle, wherein the at least one auxiliary loop bundle is arranged in the rubber-elastic casing in a region in which none of the primary loop bundles extends; and two mutually parallel-extending bearing pins, around which one or two mutually parallel-extending auxiliary loop bundles loop, are arranged on the support devices of the two adjacent bushings in each case.

* * * * *